Sept. 5, 1944.  E. S. HALL  2,357,735

MECHANISM FOR THE INTERCONVERSION OF RECIPROCATION AND ROTATION

Filed July 3, 1943  3 Sheets-Sheet 1

INVENTOR
Edwin S. Hall.

Sept. 5, 1944.  E. S. HALL  2,357,735
MECHANISM FOR THE INTERCONVERSION OF RECIPROCATION AND ROTATION
Filed July 3, 1943  3 Sheets-Sheet 2
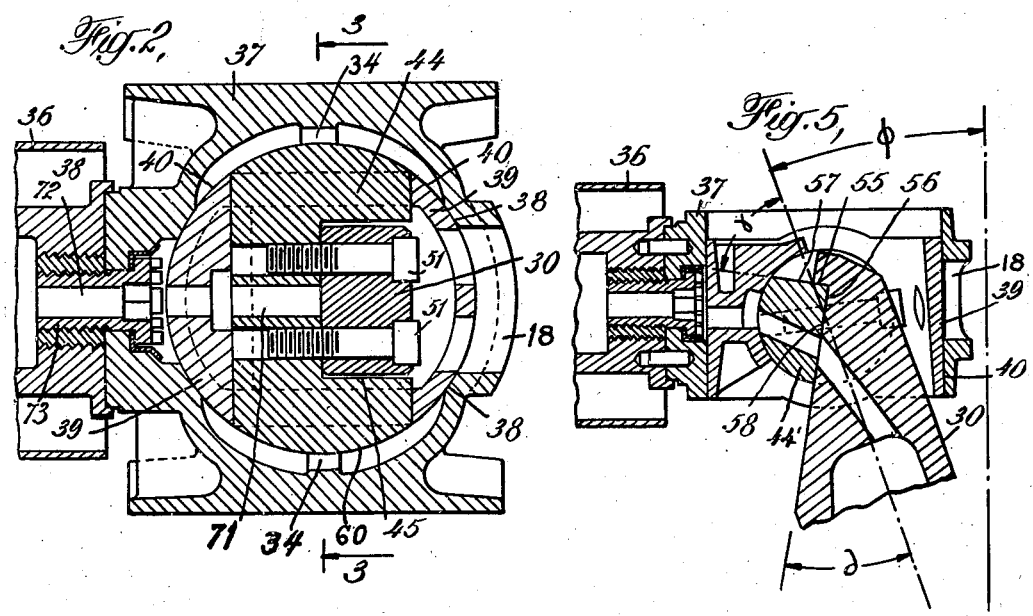
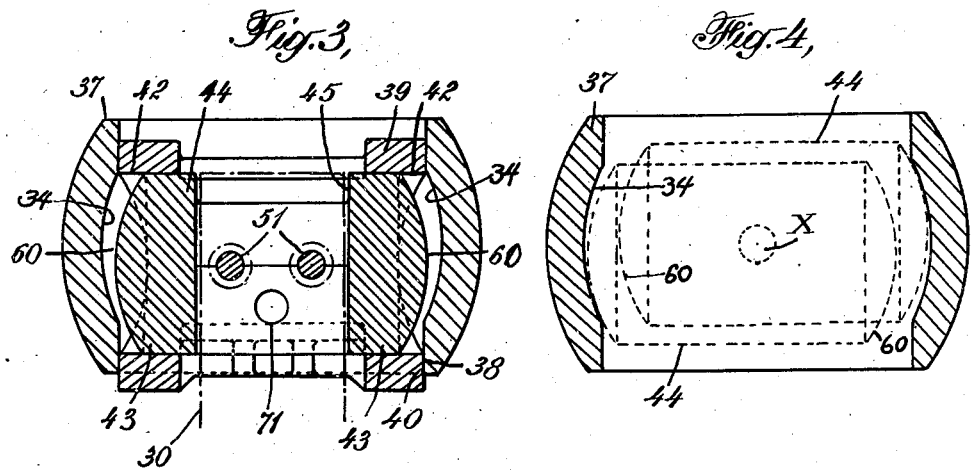
INVENTOR
Edwin S. Hall Sept. 5, 1944. E. S. HALL 2,357,735
MECHANISM FOR THE INTERCONVERSION OF RECIPROCATION AND ROTATION
Filed July 3, 1943 3 Sheets-Sheet 3
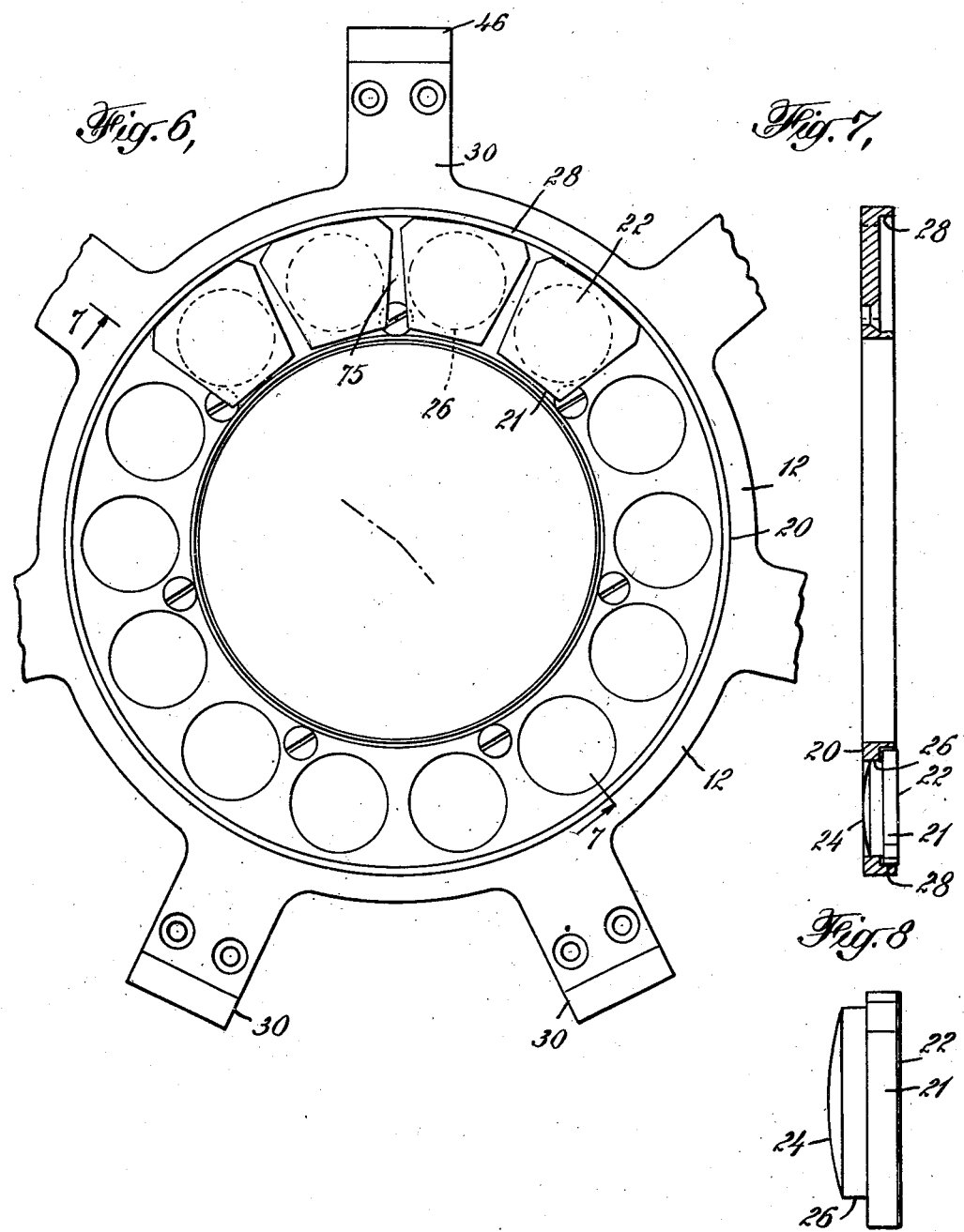
INVENTOR
Edwin S. Hall Patented Sept. 5, 1944

2,357,735

UNITED STATES PATENT OFFICE 2,357,735

MECHANISM FOR THE INTERCONVERSION OF RECIPROCATION AND ROTATION

Edwin S. Hall, Farmington, Conn., assignor to Rogers Diesel and Aircraft Corporation, Bronx, N. Y., a corporation of New York Application July 3, 1943, Serial No. 493,416

19 Claims. (Cl. 74—60)

This invention relates to mechanism for the interconversion of reciprocation and rotation for use in engines, pumps, and compressors of the class having cylinders parallel to the shaft, the class commonly known as barrel type, axial, round, or circle mechanisms.

In describing such mechanisms, the terms "swashplate" and "wabble plate" or "wobbler" have been used more or less indiscriminately for plate structures inclined to the shaft and operably connecting the reciprocating parts to the shaft. Herein a plate rotating with and inclined to the shaft is called a "slant." A plate structure mounted on bearings on and inclined to the shaft could properly be called a "connecting plate" or "conplate" since it connects rotating and reciprocating parts; but herein this plate member, operably mounted on bearings on and inclined to the shaft and having radiating arms operably connected to the several reciprocating members, is called a "starplate."

Correct starplate motion is three-dimensional, not easy to predetermine correctly with any restraint adequate for carrying high torque. It is desirable, therefore, that the starplate be kept free from torque. Torque on the starplate can arise from the operable connections between the starplate and the reciprocating members, or from friction in the bearing which operably connects the starplate with the rotating shaft. The object of this invention is to provide a starplate mechanism so constructed that the torque on the starplate from both these sources may be minimized, the operable connection between the starplate and each reciprocating member including a wristpin held with its axis substantially tangent to a circle in the plane of the starplate, and the starplate bearing being so constructed as to have low friction.

The preferred construction of such a starplate mechanism includes reciprocating members, each having a piston portion and a crosshead portion, a pinhead operable in a bore thru the crosshead portion, a wristpin operable in a bore thru the pinhead, an arm on the starplate to which the wristpin is fastened, and bearings on which the starplate is operably mounted on the shaft. To predetermine correctly the starplate motion, the ends of the wristpin are spherical, and an internal surface is provided in the crosshead to coact with the wristpin ends. An object of the invention is to provide improved crosshead design, facilitating the machining of this internal surface. Further objects are to provide an operable connection between the starplate and each reciprocating member having an improved means for securing the wristpin to the starplate so constructed that the driving forces of the piston have no components tending to separate the wristpin from the starplate, their contacting surfaces being angular, each making a larger angle with the plane of the starplate than the angle between the plane of the starplate and a plane normal to the shaft; to provide means securing the wristpin to the starplate acting substantially in line with the driving forces, the parts being held together by the driving forces and the securing means on the power stroke, and primarily by the securing means on the opposite stroke of the reciprocating member; to provide an operable connection between the starplate and reciprocating member so arranged that the loading of the driving forces will be direct compression loading in the wristpin and its associated parts; to provide an operable connection between the starplate and reciprocating piston member so constructed that the wristpin and its pinhead can be readily removable, for accessibility to the piston and its oil control rings; to provide an efficient operable connection between the starplate and the rotating shaft comprising an improved slipper bearing; to provide, in such a bearing, slippers operably pivoted on a face of the starplate and coacting with a bearing face on the slant which is secured to the shaft; to provide, in such a bearing, a construction by which turbulence in the oil may be avoided and the oil metered into the bearing and ejected promptly after being used, to avoid unnecessary heat in the bearing; and to provide a cage member substantially filling the space not occupied by the slippers within the bearing and serving to maintain the slippers in position, the cage having lips whose clearances relative to the slant may control the flow of oil into and out of the bearing.

Further details of the invention will appear from the following description in connection with the drawings in which Fig. 1 is a sectional elevation of a portion of a mechanism constructed in accordance with the invention;

Fig. 2 is an enlarged section radial to the mechanism, taken substantially on line 2—2 of Fig. 1, looking in the direction of the arrows;

Fig. 3 is a transverse section on line 3—3 of Fig. 2;

Fig. 4 is a view similar to Fig. 3 but illustrating diagrammatically successive positions of the wristpin relative to the crosshead;

Fig. 5 is a sectional elevation similar to Fig. 1 showing a slightly modified construction of wristpin and starplate;

Figure 1:
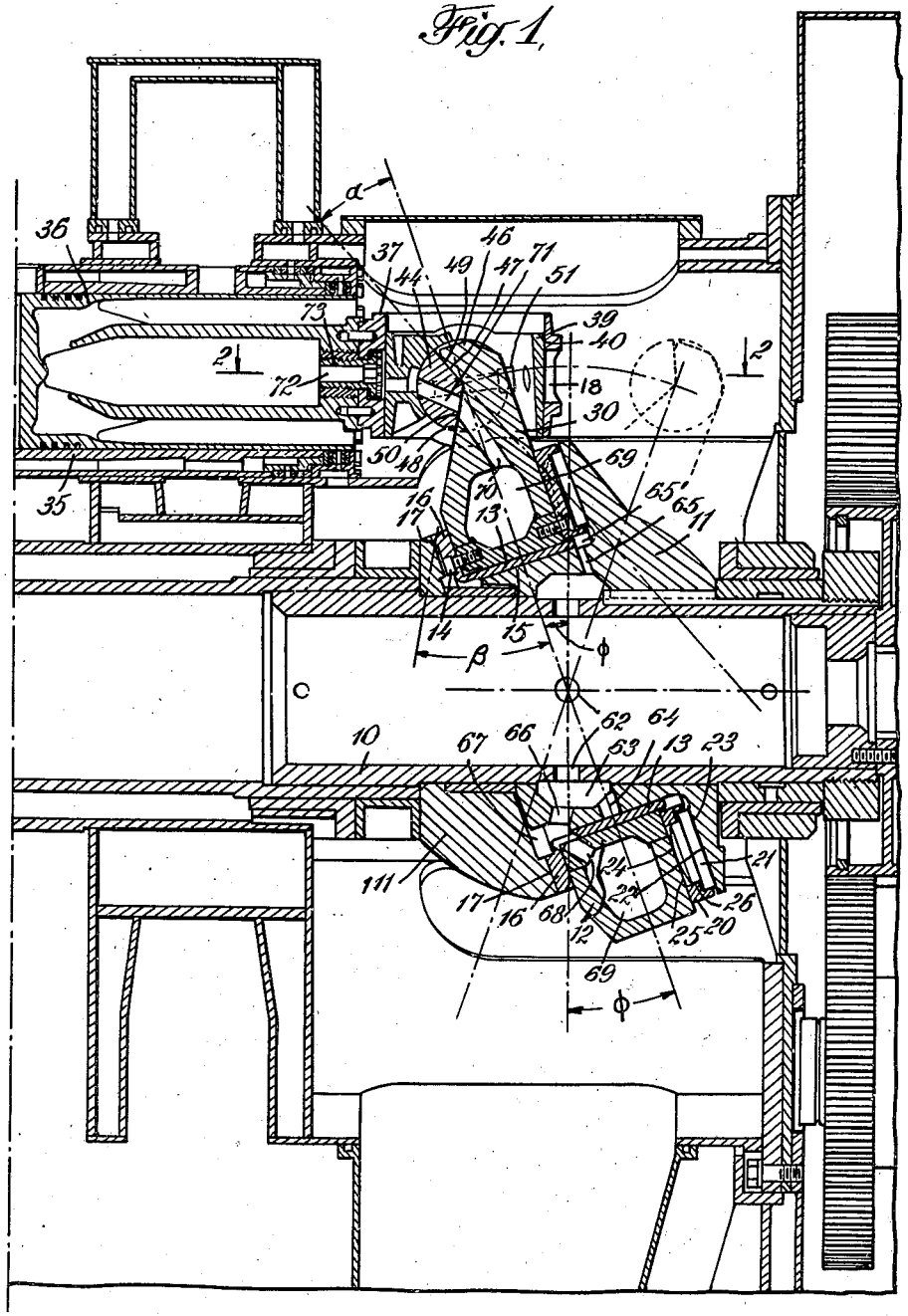

Fig. 6 is a plan or face view of one face of the starplate showing slippers and slipper cage;

Fig. 7 is a sectional elevation of the slipper cage with one slipper in place; and Fig. 8 is an end view of one of the slippers.

In the particular embodiment of the invention illustrated, shaft 10, preferably hollow, is mounted for rotation in suitable bearings in the frame of the mechanism. Slant 11 is keyed to shaft 10 and is held against axial movement on the shaft by a suitable shoulder and nut.

Starplate 12 is mounted on slant 11, journal bearing 13 being secured to starplate 12 by screws 14, and operable on journal bearing surface 15 of slant 11. Journal bearing 13 has flange 16 which forms a thrust bearing engaging plane bearing surface 17 on slant 11.

A ring or cage 20 is fastened to starplate 12 and has holes receiving slippers 21 whose segmental portions have plane surfaces 22 engaging plane bearing surface 23 on slant 11. Slippers 21 have spherical backs 24 engaging a hardened plane surface 25 on starplate 12. Slippers 21 have cylindrical portions 26 loosely fitting in the holes in cage 20.

Cage 20 has an outer lip 28, running with predetermined clearance relative to slant 11 to control the flow of oil out of the bearing. Outer lip 28 also engages the segmental portion of each slipper 21 preventing the rotation of the slipper.

Starplate 12, as shown in Fig. 6, has a plurality of radial arms 30, one for each of the several reciprocating members of the mechanism.

The frame of the mechanism has cylinders 35 arranged parallel to shaft 10 and reciprocatable in each cylinder 35 is piston 36. Each piston 36 has secured thereto a crosshead 37 mounted in a crosshead guide and having a cylindrical opening or bearing surface 38, its axis radial to shaft 10. Pinhead 39 has cylindrical exterior 40 operably fitting bearing surface 38 of crosshead 37. Pinhead 39 in turn has an inner cylindrical bearing surface 42 in which wristpin 44 is operable.

Each arm 30 of starplate 12 is secured to one of the wristpins 44 in the following manner.

As shown in Figs. 1 and 2, wristpin 44 is recessed at 45 and receives arm 30 which has angular surfaces 47 and 48 which engage corresponding and complementary surfaces 49 and 50 on wristpin 44. Bolts 51 secure the arms 30 to the wristpins. A clearance between the sides of the arm and the recess walls permits limited axial adjustment of the wristpin.

The angle between surfaces 47 and 48, and between 49 and 50, is so determined that in all positions of the piston and starplate the reaction or force between these parts tends to hold wristpin 44 and end 46 of arm 30 in contact with each other, and, conversely, there is no component of the driving force of piston 36 which tends to separate these parts. To accomplish this end, each angle α and β (Fig. 1), between the surfaces 47 and 48 respectively and the plane of starplate 12 must be greater than the angle φ between the plane of the starplate and the plane normal to the axis of shaft 10.

In the modification shown in Fig. 5, surfaces 55 and 56 of arm 30 are at right angles, and wristpin 44' has corresponding right-angled surfaces 57 and 58 engaging them. Here again, each angle γ and δ between the surfaces 55 and 56 and the plane of starplate 12 is greater than the angle φ between the plane of starplate 12 and the plane normal to the axis of shaft 10.

In either modification, the driving forces of piston 36 and the clamping action of screws 51 are always within the angle included between the two surfaces on which the wristpin is seated on arm 30, so that there is no component of either tending to separate the wristpin from the arm.

In either modification of the mechanism, correct movement of the starplate requires that the center of each wristpin 44 moves in a path describing a lemniscate on the surface of a sphere, which curve, in end view, appears circular, as shown at X in Fig. 4. Fig. 4 also indicates with dash lines successive positions of wristpin 44, showing how the spherical ends 60 of wristpin 44 coact with internal surfaces 34 of crosshead 37. It is understood that the successive contacts of these spherical ends 60 of the several wristpins 44 with interior surfaces 34 of the several crossheads 37, combine to predetermine correctly the motion of starplate 12. Machining the surfaces 34 in crosshead 37 is facilitated by providing axial opening 18 in the end of crosshead 37, thru which opening 18 the tool for machining surfaces 34 may be introduced. Opening 18 also provides access to screws 51.

In operation, reciprocation of pistons 36 is accompanied by rotation of shaft 10 in a well-known manner. Oil is fed under pressure thru hollow shaft 10 out thru openings 62 into annular chamber 63 from which it passes thru openings 64 to bearing 13, thru openings 65 to annular space 65', and thru openings 66 to annular space 67. From space 67 oil passes thru openings 68 into annular chamber 69 in starplate 12 and from this chamber thru passages 70 to conduits 71 in wristpins 44, thru holes 72 in hollow screws 73, which secure crossheads 37 to pistons 36, and into pistons 36 for cooling. Oil from space 65' is metered by the inner lip of cage 20 into the slipper bearing directly at the working faces of slippers 21 where they coact with bearing surface 23 of slant 11. Radial clearance spaces 75 between adjacent slippers 21 are restricted outwardly to further induce oil to flow between the working faces of slippers 21 and bearing surface 23 of slant 11. As soon as the oil has been used in the bearing, it tends to be thrown out of the bearing by centrifugal force and the pressure of incoming oil, thru the clearance between outer lip 28 and the face of slant 11.

From the foregoing, it is clear that the objects of the invention have been attained and an improved mechanism provided for operably connecting reciprocating and rotating parts in a round engine mechanism. Although specific embodiments of the invention have been particularly shown and described, it will be understood that the invention is capable of modification and that changes in the construction and in the arrangement of the various parts may be made without departing from the spirit or scope of the invention, as expressed in the following claims.

I claim:

1. In a machine of the class described, a shaft, cylinders parallel thereto, reciprocating members operable in said cylinders, and mechanism operably connecting said reciprocating members to said shaft, said mechanism including a starplate operably connected to said reciprocating members and operably mounted upon said shaft, the operable connection between each of said reciprocating members and said starplate including a wristpin held with its axis substantially tangent to a circle in the plane of said starplate, and the operable mounting of said starplate upon said shaft including a pivoted slipper bearing comprising a slant rotating with said shaft, slippers pivoted on said starplate and coacting with said slant, and a cage member preventing rotation of said slippers relative to said starplate and controlling the flow of oil into and thru said bearing.

2. In a machine of the class described, a shaft, cylinders parallel thereto, reciprocating members operable in said cylinders, and mechanism operably connecting said reciprocating members to said shaft, said mechanism including a starplate operably connected to said reciprocating members and operably mounted upon said shaft, the operable connection between said starplate and each reciprocating member including an arm on said starplate, two plane faces on said arm and a wristpin formed to engage said plane faces, the angle between each of said plane faces and the plane of said starplate being greater than the angle between the plane of said starplate and a plane normal to said shaft, and means holding said wristpin in engagement with said plane faces.

3. In a machine of the class described, a shaft, cylinders parallel thereto, reciprocating members operable in said cylinders, and mechanism operably connecting said reciprocating members to said shaft, said mechanism including a starplate operably connected to said reciprocating members and operably mounted upon said shaft, the operable connection between said starplate and each reciprocating member including an arm on said starplate, a wristpin, and bolts thru said arm holding said wristpin against the loaded side of said arm.

4. In a machine of the class described, a shaft, cylinders parallel thereto, reciprocating members operable in said cylinders and each including a crosshead portion and a piston portion at one end of said crosshead portion, a starplate operably mounted on and inclined to said shaft, an arm on said starplate for each of said reciprocating members, a wristpin held against the piston side of said arm by the driving forces of said piston portion, and screws extending thru the arm from the other side thereof securing said wristpin to said arm.

5. In a machine of the class described, a shaft, cylinders parallel thereto, reciprocating members operable in said cylinders and each including a crosshead portion having a bore substantially radial to said shaft, a pinhead operable in said bore, a wristpin operable in said pinhead, a starplate operably mounted on and inclined to said shaft, an arm on said starplate for each of said reciprocating members, screws securing said wristpin to said arm, and openings in said crosshead and in said pinhead thru which to assemble and remove said screws.

6. In a machine of the class described, a shaft, cylinders parallel thereto, reciprocating members operable in said cylinders and each including a crosshead portion, and mechanism operably connecting said reciprocating members to said shaft, said mechanism including a starplate operably connected to said reciprocating members and operably mounted upon said shaft, the operable connection between said starplate and each reciprocating member including an arm on said starplate, a cylindrical wristpin secured to said arm and having spherical ends, internal surfaces in said crosshead operably engaging said spherical wristpin ends, and an axial opening in the end of said crosshead to facilitate machining said internal surfaces.

7. In mechanism of the character described, a shaft, a starplate operably mounted on and inclined thereto, a reciprocating member movable on an axis parallel to said shaft, an arm on said starplate, and a wristpin fixed to said arm and operably connected to said reciprocating member, said wristpin and arm having contacting surfaces each making a larger angle with the plane of said starplate than the angle between the plane of said starplate and a plane normal to said shaft.

8. In mechanism of the character described, a shaft, a starplate operably mounted on and inclined thereto, a reciprocating member movable on an axis parallel to said shaft, an arm on said starplate, and a wristpin mounted on said arm with limited axial adjustability and operably connected to said reciprocating member, said wristpin and arm having contacting surfaces each making a larger angle with the plane of said starplate than the angle between the plane of said starplate and a plane normal to said shaft.

9. In a single-ended mechanism of the character described, a shaft, a starplate operably mounted on the shaft, a single-ended reciprocating member having a piston at only one end thereof, an arm on said starplate, a wristpin secured to and held against the piston side of said arm, and means securing said wristpin to said arm and acting substantially in the same direction as the driving forces of said piston to hold said wristpin against the piston side of said arm.

10. In a machine of the class described, a shaft, cylinders parallel to said shaft, piston members operable in said cylinders, and a starplate mechanism operably connecting said piston members with said shaft and including a pivoted slipper bearing, in combination with conduits in said mechanism conducting oil from within said shaft in two separate flows, one to and thru said pivoted slipper bearing, and the other into and thru said starplate mechanism into said piston members to lubricate parts of said mechanism and to cool the pistons.

11. In a machine of the class described, a shaft, cylinders parallel thereto, piston members operable in said cylinders, and mechanism operably connecting said reciprocating members and said shaft, said mechanism including a starplate, an arm on said starplate for each of said reciprocating members, two surfaces on said arm and at an angle to each other, a wristpin formed to engage said surfaces, and means securing said wristpin in engagement with said surfaces, said surfaces being so arranged that the principal driving forces of said piston member and the line of clamping action of said securing means are both within the angle included between said surfaces.

12. In a machine of the class described, a shaft, cylinders parallel thereto, reciprocating members operable in said cylinders, and a mechanism operably connecting said reciprocating members with said shaft, said mechanism including a starplate, operable connections between said starplate and said reciprocating members, and a slipper bearing operably mounting said starplate on said shaft and including a slant rotating with said shaft, and slippers pivoted on said starplate and operably coacting with said slant, and a cage member positioning said slippers relative to said starplate and controlling the flow of oil into and thru said bearing.

13. In mechanism of the class described, a shaft, cylinders parallel thereto, reciprocating members operable in said cylinders, and a mechanism operably connecting said reciprocating members with said shaft, said mechanism including a starplate, operable connections between said starplate and said reciprocating members, and a slipper bearing operably mounting said starplate on said shaft and including a slant rotating with said shaft, slippers pivoted on a hardened plane face of said starplate and operably coacting with a plane bearing face of said slant, and a cage member positioning said slippers relative to said starplate and substantially filling the space between said slippers within said bearing.

14. In combination, a slant, a starplate mounted thereon, a cage between said slant and said starplate, and slippers mounted in said cage and having bearing surfaces operably engaging said slant with fluid film lubrication and pivot surfaces engaging said starplate, and means for conducting oil to said cage and between said cage and said slant and between the slippers and to the bearing surfaces.

15. In combination, a slant having a working face, a starplate operably associated with said slant and having a seat for slippers, said slipper seat being substantially flat, and a slipper bearing between said slant and said starplate, said slipper bearing comprising slippers having faces conforming to said slant working face and operable thereon with fluid film lubrication, said slippers having substantially spherical pivot surfaces seated with nominally point contact on said slipper seat, and means loosely positioning said slippers on said starplate and controlling the flow of oil into and out of said slipper bearing.

16. In combination, in an engine mechanism having a shaft and cylinders parallel thereto, a slant rotatable with said shaft, a starplate adjacent to said slant, and a slipper bearing between said slant and said starplate and comprising slippers pivotally mounted on said starplate and operably engaging said slant with fluid film lubrication, means locating said slippers relative to said starplate, and means comprising a predetermined clearance between an inner lip of said starplate and said slant for controlling the flow of oil from within said shaft into said slipper bearing.

17. In combination, in an engine mechanism having a shaft and cylinders parallel thereto, a slant rotatable with said shaft, a starplate adjacent to said slant, and a slipper bearing between said slant and said starplate and comprising slippers pivotally mounted on said starplate and operably engaging said slant with fluid film lubrication, means locating said slippers relative to said starplate, means comprising a predetermined clearance between an inner lip of said starplate and said slant for controlling the flow of oil from within said shaft into said slipper bearing, and means comprising a predetermined clearance between an outer lip of said starplate and said slant for controlling the flow of oil out of said slipper bearing.

18. In combination, a slant having a bearing face, a starplate mounted thereon and having a face substantially parallel to said bearing face, slippers having bearing faces operably conforming to said bearing face of said slant and spherical pivot surfaces pivotally contacting said starplate face, and a cage member between said slant and said starplate positioning said slippers and directing the flow of oil between said slippers and said slant bearing face.

19. In mechanism of the class described, in combination: a shaft; reciprocating members operable parallel to said shaft; mechanism operably connecting said reciprocating members to said shaft and including a starplate; and means operably mounting said starplate on said shaft with the starplate axis inclined to the shaft axis; said means comprising two slants fastened on said shaft, a thrust face on each of said slants, a journal between said thrust faces, a journal bearing on said starplate and engaging said journal, slippers pivotally supported on said starplate and operably engaging the thrust face of one of said slants, and means on said starplate operably engaging the thrust face of the other of said slants to prevent any substantial movement of said starplate along its axis.

EDWIN S. HALL.